US010027869B2

(12) United States Patent
Premutico et al.

(10) Patent No.: US 10,027,869 B2
(45) Date of Patent: Jul. 17, 2018

(54) FLASH OPTIMIZED USING OLED DISPLAY

(71) Applicant: UNIVERSAL DISPLAY CORPORATION, Ewing, NJ (US)

(72) Inventors: Mauro Premutico, Brooklyn, NY (US); Michael Hack, Princeton, NJ (US)

(73) Assignee: Universal Display Corporation, Ewing, NJ (US)

( * ) Notice: Subject to any disclaimer, the term of this patent is extended or adjusted under 35 U.S.C. 154(b) by 0 days.

(21) Appl. No.: 15/605,986

(22) Filed: May 26, 2017

(65) Prior Publication Data
US 2017/0272631 A1 Sep. 21, 2017

Related U.S. Application Data

(63) Continuation of application No. 15/075,423, filed on Mar. 21, 2016, now Pat. No. 9,692,955.

(51) Int. Cl.
*H04N 5/225* (2006.01)
*H04N 5/235* (2006.01)
*H04N 5/58* (2006.01)
*G09G 3/3275* (2016.01)

(52) U.S. Cl.
CPC ......... *H04N 5/2256* (2013.01); *G09G 3/3275* (2013.01); *H04N 5/2351* (2013.01); *H04N 5/58* (2013.01)

(58) Field of Classification Search
CPC ...... H04N 5/2256; H04N 5/2351; H04N 5/58; G09G 3/3275
See application file for complete search history.

(56) References Cited

U.S. PATENT DOCUMENTS

| | | | |
|---|---|---|---|
| 4,769,292 | A | 9/1988 | Tang et al. |
| 5,247,190 | A | 9/1993 | Friend et al. |
| 5,703,436 | A | 12/1997 | Forrest et al. |
| 5,707,745 | A | 1/1998 | Forrest et al. |
| 5,834,893 | A | 11/1998 | Bulovic et al. |
| 5,844,363 | A | 12/1998 | Gu et al. |
| 6,013,982 | A | 1/2000 | Thompson et al. |
| 6,087,196 | A | 7/2000 | Sturm et al. |
| 6,091,195 | A | 7/2000 | Forrest et al. |
| 6,097,147 | A | 8/2000 | Baldo et al. |

(Continued)

FOREIGN PATENT DOCUMENTS

| | | |
|---|---|---|
| WO | WO-2008057394 A1 | 5/2008 |
| WO | WO-2010011390 A2 | 1/2010 |

OTHER PUBLICATIONS

Baldo, et al., "Highly efficient phosphorescent emission from organic electroluminescent devices", Nature, vol. 395, pp. 151-154, 1998.

(Continued)

*Primary Examiner* — Mekonnen Dagnew
(74) *Attorney, Agent, or Firm* — Morris & Kamlay LLP

(57) ABSTRACT

An image processing system includes an image sensor, an OLED display, a profile selection processor configured to select an output profile from among a plurality of pre-stored output profiles based at least in part on a digital representation of a target scene captured by the image sensor, and an image driver configured to drive the OLED display to display an image based on the selected output profile during a capture of an image of the target scene with the image sensor.

31 Claims, 7 Drawing Sheets

(56) References Cited

U.S. PATENT DOCUMENTS

| | | |
|---|---|---|
| 6,294,398 B1 | 9/2001 | Kim et al. |
| 6,303,238 B1 | 10/2001 | Thompson et al. |
| 6,337,102 B1 | 1/2002 | Forrest et al. |
| 6,468,819 B1 | 10/2002 | Kim et al. |
| 7,279,704 B2 | 10/2007 | Walters et al. |
| 7,431,968 B1 | 10/2008 | Shtein et al. |
| 7,745,986 B2 | 6/2010 | Ito et al. |
| 7,968,146 B2 | 6/2011 | Wagner et al. |
| 2003/0230980 A1 | 12/2003 | Forrest et al. |
| 2004/0174116 A1 | 9/2004 | Lu et al. |
| 2010/0315449 A1* | 12/2010 | Chaji ................ G09G 3/3208 345/690 |
| 2011/0267531 A1* | 11/2011 | Imai ................ H04N 5/23212 348/333.12 |
| 2012/0177352 A1* | 7/2012 | Pillman ............ H04N 5/23248 396/61 |
| 2013/0127927 A1* | 5/2013 | Ip ........................ G09G 5/10 345/690 |
| 2015/0042688 A1 | 2/2015 | Kim |
| 2015/0092073 A1* | 4/2015 | Park .................... H04N 5/232 348/218.1 |
| 2015/0264273 A1 | 9/2015 | Feder et al. |
| 2016/0055799 A1 | 2/2016 | Eom et al. |

OTHER PUBLICATIONS

Baldo, et al., "Very high-efficiency green organic light-emitting devices based on electrophosphorescence", Applied Physics Letters, vol. 75, No. 1, pp. 4-6, Jul. 5, 1999.

\* cited by examiner

FLASH OPTIMIZED USING OLED DISPLAY

FIELD OF THE INVENTION

The present invention relates to image capture devices that may be used in conjunction with devices such as organic light emitting diodes and other devices, including the same.

BACKGROUND

Opto-electronic devices that make use of organic materials are becoming increasingly desirable for a number of reasons. Many of the materials used to make such devices are relatively inexpensive, so organic opto-electronic devices have the potential for cost advantages over inorganic devices. In addition, the inherent properties of organic materials, such as their flexibility, may make them well suited for particular applications such as fabrication on a flexible substrate. Examples of organic opto-electronic devices include OLEDs, organic phototransistors, organic photovoltaic cells, and organic photodetectors. For OLEDs, the organic materials may have performance advantages over conventional materials. For example, the wavelength at which an organic emissive layer emits light may generally be readily tuned with appropriate dopants.

OLEDs make use of thin organic films that emit light when voltage is applied across the device. OLEDs are becoming an increasingly interesting technology for use in applications such as flat panel displays, illumination, and backlighting. Several OLED materials and configurations are described in U.S. Pat. Nos. 5,844,363, 6,303,238, and 5,707,745, which are incorporated herein by reference in their entirety.

One application for phosphorescent emissive molecules is a full color display. Industry standards for such a display call for pixels adapted to emit particular colors, referred to as "saturated" colors. In particular, these standards call for saturated red, green, and blue pixels. Color may be measured using CIE coordinates, which are well known to the art.

One example of a green emissive molecule is tris(2-phenylpyridine) iridium, denoted Ir(ppy)$_3$, which has the following structure:

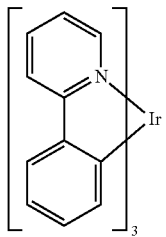

In this, and later figures herein, we depict the dative bond from nitrogen to metal (here, Ir) as a straight line.

As used herein, the term "organic" includes polymeric materials as well as small molecule organic materials that may be used to fabricate organic opto-electronic devices. "Small molecule" refers to any organic material that is not a polymer, and "small molecules" may actually be quite large. Small molecules may include repeat units in some circumstances. For example, using a long chain alkyl group as a substituent does not remove a molecule from the "small molecule" class. Small molecules may also be incorporated into polymers, for example as a pendent group on a polymer backbone or as a part of the backbone. Small molecules may also serve as the core moiety of a dendrimer, which consists of a series of chemical shells built on the core moiety. The core moiety of a dendrimer may be a fluorescent or phosphorescent small molecule emitter. A dendrimer may be a "small molecule," and it is believed that all dendrimers currently used in the field of OLEDs are small molecules.

As used herein, "top" means furthest away from the substrate, while "bottom" means closest to the substrate. Where a first layer is described as "disposed over" a second layer, the first layer is disposed further away from substrate. There may be other layers between the first and second layer, unless it is specified that the first layer is "in contact with" the second layer. For example, a cathode may be described as "disposed over" an anode, even though there are various organic layers in between.

As used herein, "solution processible" means capable of being dissolved, dispersed, or transported in and/or deposited from a liquid medium, either in solution or suspension form.

A ligand may be referred to as "photoactive" when it is believed that the ligand directly contributes to the photoactive properties of an emissive material. A ligand may be referred to as "ancillary" when it is believed that the ligand does not contribute to the photoactive properties of an emissive material, although an ancillary ligand may alter the properties of a photoactive ligand.

As used herein, and as would be generally understood by one skilled in the art, a first "Highest Occupied Molecular Orbital" (HOMO) or "Lowest Unoccupied Molecular Orbital" (LUMO) energy level is "greater than" or "higher than" a second HOMO or LUMO energy level if the first energy level is closer to the vacuum energy level. Since ionization potentials (IP) are measured as a negative energy relative to a vacuum level, a higher HOMO energy level corresponds to an IP having a smaller absolute value (an IP that is less negative). Similarly, a higher LUMO energy level corresponds to an electron affinity (EA) having a smaller absolute value (an EA that is less negative). On a conventional energy level diagram, with the vacuum level at the top, the LUMO energy level of a material is higher than the HOMO energy level of the same material. A "higher" HOMO or LUMO energy level appears closer to the top of such a diagram than a "lower" HOMO or LUMO energy level.

As used herein, and as would be generally understood by one skilled in the art, a first work function is "greater than" or "higher than" a second work function if the first work function has a higher absolute value. Because work functions are generally measured as negative numbers relative to vacuum level, this means that a "higher" work function is more negative. On a conventional energy level diagram, with the vacuum level at the top, a "higher" work function is illustrated as further away from the vacuum level in the downward direction. Thus, the definitions of HOMO and LUMO energy levels follow a different convention than work functions.

More details on OLEDs, and the definitions described above, can be found in U.S. Pat. No. 7,279,704, which is incorporated herein by reference in its entirety.

SUMMARY OF THE INVENTION

According to an embodiment, a method of selectively generating image enhancing light using an embedded OLED display, includes capturing, with an image sensor, a digital representation of a target scene upon detection of an image capture command for capture of the target scene, detecting one or more characteristics of the target scene from the digital representation, selecting a pixel output profile from among a plurality of stored output profiles based at least in part on the one or more characteristics, and driving the OLED display to generate a light output according to the selected pixel output profile to illuminate the target scene during capture of an image of the target scene with the image sensor.

The one or more characteristics can include one or more of: a distance of a focal object in the target scene from the image sensor, a location of the focal object in the target scene, ambient light intensity, and ambient light color.

The pixel output profile can be selected based at least in part on a characteristic of the image sensor.

The characteristic of the image sensor can be a level of light sensitivity of the image sensor.

The method can further include storing a record of pixel output profile selections, wherein selecting the pixel output profile is based at least in part on the stored record.

The pixel output profile can be selected based at least in part on an expected lifespan of a set of subpixels.

The pixel output profile can be configured to achieve a target color of light at a target illumination level.

The pixel output profile can include illuminating a first set of subpixels at a first intensity level and illuminating a second set of subpixels at a second intensity level.

The first set of subpixels can be yellow subpixels and the second set of subpixels can be blue subpixels.

According to an embodiment, an image processing system includes an image sensor, an OLED display, a profile selection processor configured to select an output profile from among a plurality of pre-stored output profiles based at least in part on a digital representation of a target scene captured by the image sensor, and an image driver configured to drive the OLED display to display an image based on the selected output profile during a capture of an image of the target scene with the image sensor.

The profile selection processor can be configured to select the output profile based at least in part on a characteristic of the image sensor.

The characteristic of the image sensor can be a level of light sensitivity of the image sensor.

The profile selection processor can be configured to select the output profile based at least in part on one or more characteristics of the target scene from the digital representation.

The one or more characteristics can include one or more of: a distance of a focal object in the target scene from the image sensor, a location of the focal object in the target scene, ambient light intensity, and ambient light color.

The output profile can be a single image that provides a target color based upon one or more intensity levels assigned to a plurality of subpixels.

The output profile can include a series of images that each provide a target color based upon one or more intensity levels assigned to a plurality of subpixels.

The image processing system can further include an image processor configured to adjust an image that has been captured by the image sensor based at least in part on the selected output profile displayed during capture of the image.

The image processing system can further include a memory device configured to store a record of output profile selections, and the profile selection processor can further be configured to select the pixel output profile based at least in part on the stored record.

The profile selection processor can further be configured to select the pixel output profile based at least in part on an expected lifespan of a set of subpixels.

According to an embodiment, a method of generating a flash for image capture using an OLED display having a plurality of pixels includes selecting an output profile from among a plurality of output profiles, driving a first subpixel configuration in each of the plurality of pixels according to the output profile to illuminate a target scene, capturing, with the image sensor, a first image of the target scene illuminated by the first subpixel configuration, driving a second subpixel configuration in the set of pixels according to the output profile to illuminate the target scene, capturing, with the image sensor, a second image illuminated by the second subpixel configuration, and combining the first image and the second image.

The output profile can be configured to achieve a combined white light image on the OLED display.

The output profile is configured to achieve a color on the OLED display that offsets a detection characteristic of the image sensor.

The output profile can designate the first subpixel configuration to energize a first-type subpixel a first number of times and the second subpixel configuration to energize a second-type subpixel a second number of times different from the first number.

The first-type subpixel can be a yellow subpixel and the second-type subpixel can be a blue subpixel.

The method can further include capturing a pre-image of the target scene with the image sensor, and selecting the output profile based at least in part upon data from the captured pre-image.

The output profile can be selected based on a color dispersion of existing light conditions detected in the pre-image.

The output profile can be selected based on a level of illumination detected in the pre-image.

The output profile can be selected based on the pre-image to illuminate the target scene at a level required for the image sensor to capture an image above a threshold quality level.

The method can further include driving a third subpixel configuration of a third-type subpixel in each of the plurality of pixels according to the output profile to illuminate a target scene, capturing, with the image sensor, a third image illuminated by the third-type subpixel, and combining the third image with the first image and the second image.

The first-type subpixel can be a red subpixel, the second-type pixel can be a green subpixel, and the third-type subpixel can be a blue subpixel.

According to an embodiment, an image processing system includes an image sensor, an OLED display, a profile selection processor configured to select a first output profile from among a plurality of pre-stored output profiles, an image driver configured to drive the OLED display to display a plurality of flash images based on the selected output profile, wherein each of the plurality of flash images are respectively displayed during a corresponding operation of capturing an image of the target scene with the image sensor, and an image processor configured to combine the plurality of captured images into a single image.

The output profile can be configured to achieve a combined white light image on the OLED display.

The output profile can be configured to achieve a color on the OLED display that offsets a detection characteristic of the image sensor.

The output profile can provide flash images including a first subpixel configuration to energize a first-type subpixel a first number of times and a second subpixel configuration to energize a second-type subpixel a second number of times different from the first number.

The first-type subpixel can be a yellow subpixel and the second-type subpixel can be a blue subpixel.

The system can further be configured to capture a pre-image of the target scene with the image sensor, and the profile selection processor can further be configured to select the output profile based at least in part upon data from the captured pre-image.

The profile selection processor can be configured to select the output profile based on a color dispersion of existing light conditions detected in the pre-image.

The profile selection processor can be configured to select the output profile based on a level of illumination detected in the pre-image.

The profile selection processor can be configured to select the output profile based on the pre-image to illuminate the target scene at a level required for the image sensor to capture an image above a threshold quality level.

The plurality of flash images can include a first image that energizes red subpixels, a second image that energizes green subpixels, and a third image that energizes blue subpixels.

According to an embodiment, a method of generating a flash for image capture using an OLED, includes initiating capture of a target scene with an image sensor, driving a first-type subpixel in a set of pixels during a first frame of a display-implemented flash cycle to illuminate the target scene, driving a second-type of subpixel in the set of pixels during a second frame of the display-implemented flash cycle to illuminate the target scene, and completing capture of the target scene with the image sensor.

The first-type subpixel can be a yellow subpixel and the second-type subpixel can be a blue subpixel.

The method can further comprise driving a third-type subpixel in the set of pixels during a third frame of the display-implemented flash cycle to illuminate the target scene prior to completing capture of the target scene.

The first-type subpixel can be a red subpixel, the second-type pixel can be a green subpixel, and the third-type subpixel can be a blue subpixel.

According to an embodiment, an image processing system, includes an image sensor, an OLED display, a profile selection processor configured to select a first output profile from among a plurality of pre-stored output profiles, an image sensor driver configured to initiate capture of the target scene with the image sensor, and an image driver configured to drive the OLED display to sequentially display a plurality of images based on the selected output profile when the image sensor driver initiates capture of the target scene with the image sensor, wherein the image sensor driver is configured to complete capture of the target scene with the image sensor when the image driver completes driving the OLED display to display the plurality of images.

The plurality of images can include a first image that energizes red subpixels, a second image that energizes green subpixels, and a third image that energizes blue subpixels.

The system can further be configured to capture a pre-image of the target scene with the image sensor, and the profile selection processor can further be configured to select the output profile based at least in part upon data from the captured pre-image.

The profile selection processor can be configured to select the output profile based on a color dispersion of existing light conditions detected in the pre-image.

The profile selection processor can be configured to select the output profile based on a level of illumination detected in the pre-image.

The profile selection processor can be configured to select the output profile based on the pre-image to illuminate the target scene at a level required for the image sensor to capture an image above a threshold quality level.

According to an embodiment, a first device comprising a first organic light emitting device is also provided. The first organic light emitting device can include an anode, a cathode, and an organic layer, disposed between the anode and the cathode. The first device can include an image sensor, the first organic light emitting device in a display, a profile selection processor configured to select an output profile from among a plurality of pre-stored output profiles based at least in part on a digital representation of a target scene captured by the image sensor, and an image driver configured to drive the OLED display to display an image based on the selected output profile during a capture of an image of the target scene with the image sensor. The first device can be a consumer product, an organic light-emitting device, and/or a lighting panel.

DETAILED DESCRIPTION

Figure 1:
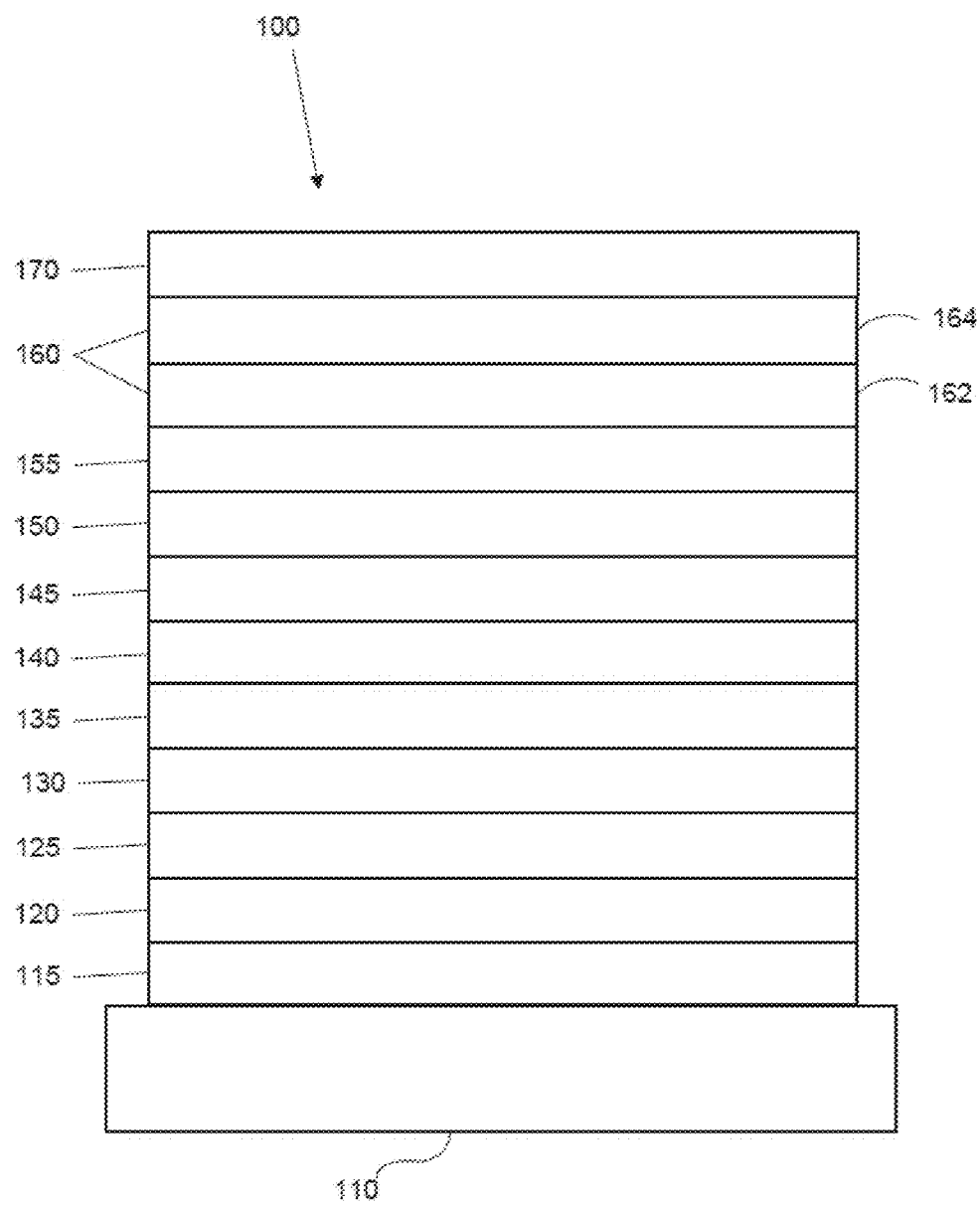
FIG. 1 shows an organic light emitting device.

Various aspects or features of this disclosure are described with reference to the drawings, wherein like reference numerals are used to refer to like elements throughout. In this specification, numerous details are set forth in order to provide a thorough understanding of this disclosure. It should be understood, however, that certain aspects of disclosure may be practiced without these specific details, or with other methods, components, materials, etc. In other instances, well-known structures and devices are shown in block diagram form to facilitate describing the subject disclosure.

A single pixel in an OLED display is made of several subpixels, for example, red, green and blue. The luminance of an OLED display with all subpixels energized is limited by the power supply of the device in which the display is disposed. This power limit restricts the amount of light that can be generated by a conventional display, which leaves the conventional OLED display less than adequate for use as a flash. In addition, generally each of the subpixels has unique performance characteristics which may fluctuate with usage. Management of such subpixel usage and performance characteristics may be critical in order to maintain overall sustained display quality and avoid unwanted deterioration of the displayed images.

Figure 3:
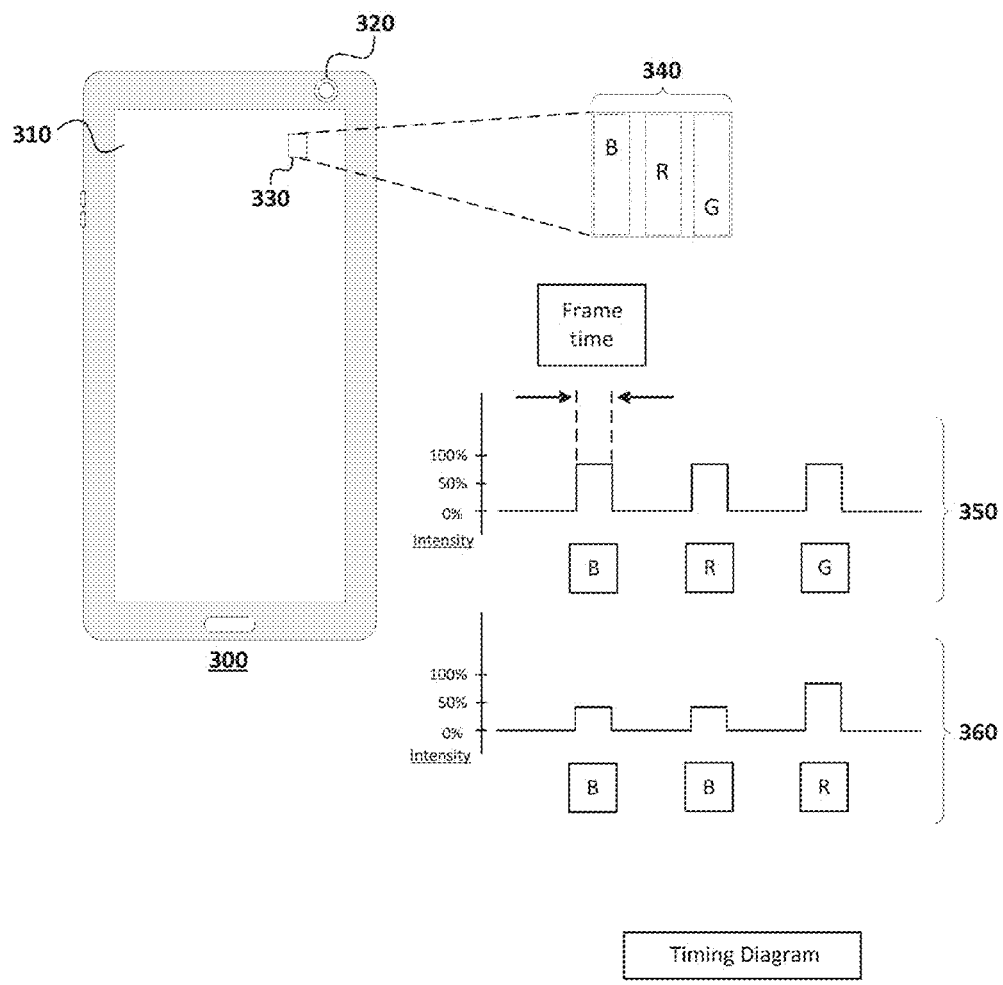
FIG. 3 shows cell phone including an organic light emitting device according to a disclosed embodiment.

The disclosed embodiments provide a display-implemented flash configured to precisely manage the color generation and energy level of each individual pixel of an OLED display. FIG. 3 shows a cell phone 300 including an OLED display 310 and an image sensor 320 suitable for an embodiment of the disclosed subject matter. The display 310 includes an array of pixels 330, each including several subpixels 340. When the image sensor 320 is activated to capture an image, the OLED display 310 can be configured to generate a light output according to a selected pixel output profile in order to illuminate a target scene. The output profile can take into account several factors and function on a subpixel 340 level. The disclosed embodiments provide many advantages, including increased efficiencies of usage and reducing unnecessary burn-in impact from continued use.

Generally, an OLED comprises at least one organic layer disposed between and electrically connected to an anode and a cathode. When a current is applied, the anode injects holes and the cathode injects electrons into the organic layer(s). The injected holes and electrons each migrate toward the oppositely charged electrode. When an electron and hole localize on the same molecule, an "exciton," which is a localized electron-hole pair having an excited energy state, is formed. Light is emitted when the exciton relaxes via a photoemissive mechanism. In some cases, the exciton may be localized on an excimer or an exciplex. Non-radiative mechanisms, such as thermal relaxation, may also occur, but are generally considered undesirable.

The initial OLEDs used emissive molecules that emitted light from their singlet states ("fluorescence") as disclosed, for example, in U.S. Pat. No. 4,769,292, which is incorporated by reference in its entirety. Fluorescent emission generally occurs in a time frame of less than 10 nanoseconds.

More recently, OLEDs having emissive materials that emit light from triplet states ("phosphorescence") have been demonstrated. Baldo et al., "Highly Efficient Phosphorescent Emission from Organic Electroluminescent Devices," Nature, vol. 395, 151-154, 1998; ("Baldo-I") and Baldo et al., "Very high-efficiency green organic light-emitting devices based on electrophosphorescence," Appl. Phys. Lett., vol. 75, No. 3, 4-6 (1999) ("Baldo-II"), which are incorporated by reference in their entireties. Phosphorescence is described in more detail in U.S. Pat. No. 7,279,704 at cols. 5-6, which are incorporated by reference.

FIG. 1 shows an organic light emitting device 100. The figures are not necessarily drawn to scale. Device 100 may include a substrate 110, an anode 115, a hole injection layer 120, a hole transport layer 125, an electron blocking layer 130, an emissive layer 135, a hole blocking layer 140, an electron transport layer 145, an electron injection layer 150, a protective layer 155, a cathode 160, and a barrier layer 170. Cathode 160 is a compound cathode having a first conductive layer 162 and a second conductive layer 164. Device 100 may be fabricated by depositing the layers described, in order. The properties and functions of these various layers, as well as example materials, are described in more detail in U.S. Pat. No. 7,279,704 at cols. 6-10, which are incorporated by reference.

More examples for each of these layers are available. For example, a flexible and transparent substrate-anode combination is disclosed in U.S. Pat. No. 5,844,363, which is incorporated by reference in its entirety. An example of a p-doped hole transport layer is m-MTDATA doped with $F_4$-TCNQ at a molar ratio of 50:1, as disclosed in U.S. Patent Application Publication No. 2003/0230980, which is incorporated by reference in its entirety. Examples of emissive and host materials are disclosed in U.S. Pat. No. 6,303,238 to Thompson et al., which is incorporated by reference in its entirety. An example of an n-doped electron transport layer is BPhen doped with Li at a molar ratio of 1:1, as disclosed in U.S. Patent Application Publication No. 2003/0230980, which is incorporated by reference in its entirety. U.S. Pat. Nos. 5,703,436 and 5,707,745, which are incorporated by reference in their entireties, disclose examples of cathodes including compound cathodes having a thin layer of metal such as Mg:Ag with an overlying transparent, electrically-conductive, sputter-deposited ITO layer. The theory and use of blocking layers is described in more detail in U.S. Pat. No. 6,097,147 and U.S. Patent Application Publication No. 2003/0230980, which are incorporated by reference in their entireties. Examples of injection layers are provided in U.S. Patent Application Publication No. 2004/0174116, which is incorporated by reference in its entirety. A description of protective layers may be found in U.S. Patent Application Publication No. 2004/0174116, which is incorporated by reference in its entirety.

Figure 2:
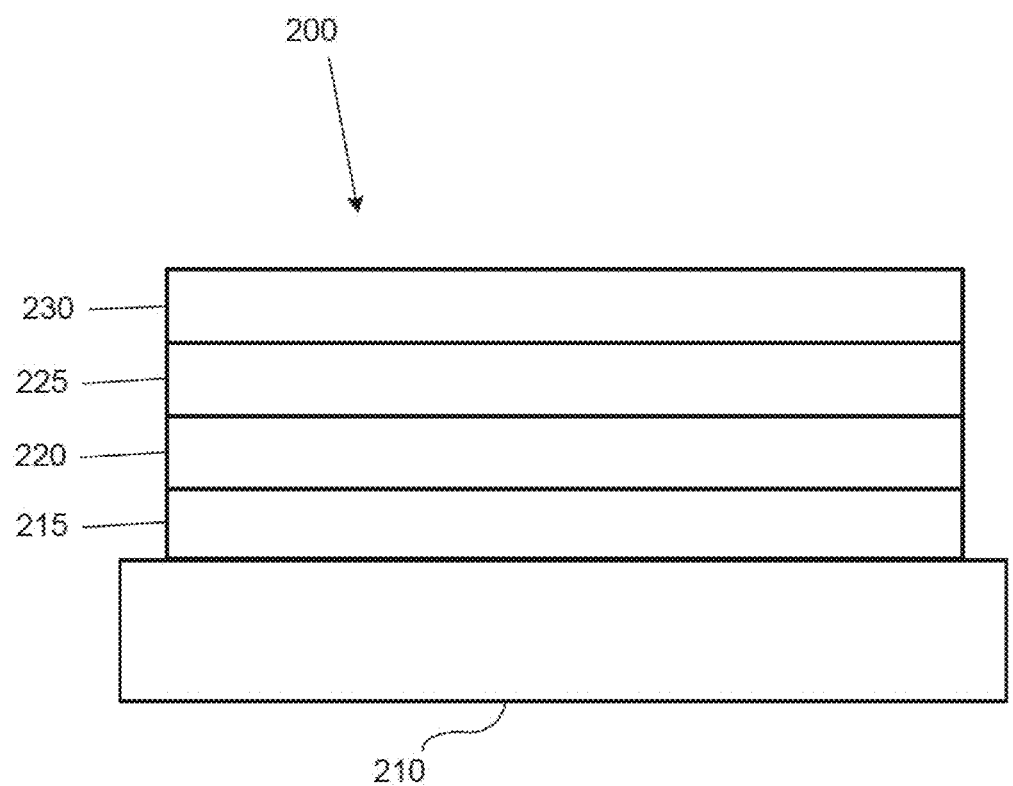
FIG. 2 shows an inverted organic light emitting device that does not have a separate electron transport layer.

FIG. 2 shows an inverted OLED 200. The device includes a substrate 210, a cathode 215, an emissive layer 220, a hole transport layer 225, and an anode 230. Device 200 may be fabricated by depositing the layers described, in order. Because the most common OLED configuration has a cathode disposed over the anode, and device 200 has cathode 215 disposed under anode 230, device 200 may be referred to as an "inverted" OLED. Materials similar to those described with respect to device 100 may be used in the corresponding layers of device 200. FIG. 2 provides one example of how some layers may be omitted from the structure of device 100.

The simple layered structure illustrated in FIGS. 1 and 2 is provided by way of non-limiting example, and it is understood that embodiments of the invention may be used in connection with a wide variety of other structures. The specific materials and structures described are exemplary in nature, and other materials and structures may be used. Functional OLEDs may be achieved by combining the various layers described in different ways, or layers may be omitted entirely, based on design, performance, and cost factors. Other layers not specifically described may also be included. Materials other than those specifically described may be used. Although many of the examples provided herein describe various layers as comprising a single material, it is understood that combinations of materials, such as a mixture of host and dopant, or more generally a mixture, may be used. Also, the layers may have various sublayers. The names given to the various layers herein are not intended to be strictly limiting. For example, in device 200, hole transport layer 225 transports holes and injects holes into emissive layer 220, and may be described as a hole transport layer or a hole injection layer. In one embodiment, an OLED may be described as having an "organic layer" disposed between a cathode and an anode. This organic layer may comprise a single layer, or may further comprise multiple layers of different organic materials as described, for example, with respect to FIGS. 1 and 2.

Structures and materials not specifically described may also be used, such as OLEDs comprised of polymeric materials (PLEDs) such as disclosed in U.S. Pat. No. 5,247,190 to Friend et al., which is incorporated by reference in its entirety. By way of further example, OLEDs having a single organic layer may be used. OLEDs may be stacked, for example as described in U.S. Pat. No. 5,707,745 to Forrest et al, which is incorporated by reference in its entirety. The OLED structure may deviate from the simple layered structure illustrated in FIGS. 1 and 2. For example, the substrate may include an angled reflective surface to improve outcoupling, such as a mesa structure as described in U.S. Pat. No. 6,091,195 to Forrest et al., and/or a pit structure as described in U.S. Pat. No. 5,834,893 to Bulovic et al., which are incorporated by reference in their entireties.

Unless otherwise specified, any of the layers of the various embodiments may be deposited by any suitable method. For the organic layers, preferred methods include thermal evaporation, ink-jet, such as described in U.S. Pat. Nos. 6,013,982 and 6,087,196, which are incorporated by reference in their entireties, organic vapor phase deposition (OVPD), such as described in U.S. Pat. No. 6,337,102 to Forrest et al., which is incorporated by reference in its entirety, and deposition by organic vapor jet printing (OVJP), such as described in U.S. Pat. No. 7,431,968, which is incorporated by reference in its entirety. Other suitable deposition methods include spin coating and other solution based processes. Solution based processes are preferably carried out in nitrogen or an inert atmosphere. For the other layers, preferred methods include thermal evaporation. Preferred patterning methods include deposition through a mask, cold welding such as described in U.S. Pat. Nos. 6,294,398 and 6,468,819, which are incorporated by reference in their entireties, and patterning associated with some of the deposition methods such as ink-jet and OVJD. Other methods may also be used. The materials to be deposited may be modified to make them compatible with a particular deposition method. For example, substituents such as alkyl and aryl groups, branched or unbranched, and preferably containing at least 3 carbons, may be used in small molecules to enhance their ability to undergo solution processing. Substituents having 20 carbons or more may be used, and 3-20 carbons is a preferred range. Materials with asymmetric structures may have better solution processability than those having symmetric structures, because asymmetric materials may have a lower tendency to recrystallize. Dendrimer substituents may be used to enhance the ability of small molecules to undergo solution processing.

Devices fabricated in accordance with embodiments of the present invention may further optionally comprise a barrier layer. One purpose of the barrier layer is to protect the electrodes and organic layers from damaging exposure to harmful species in the environment including moisture, vapor and/or gases, etc. The barrier layer may be deposited over, under or next to a substrate, an electrode, or over any other parts of a device including an edge. The barrier layer may comprise a single layer, or multiple layers. The barrier layer may be formed by various known chemical vapor deposition techniques and may include compositions having a single phase as well as compositions having multiple phases. Any suitable material or combination of materials may be used for the barrier layer. The barrier layer may incorporate an inorganic or an organic compound or both. The preferred barrier layer comprises a mixture of a polymeric material and a non-polymeric material as described in U.S. Pat. No. 7,968,146, PCT Pat. Application Nos. PCT/US2007/023098 and PCT/US2009/042829, which are herein incorporated by reference in their entireties. To be considered a "mixture", the aforesaid polymeric and non-polymeric materials comprising the barrier layer should be deposited under the same reaction conditions and/or at the same time. The weight ratio of polymeric to non-polymeric material may be in the range of 95:5 to 5:95. The polymeric material and the non-polymeric material may be created from the same precursor material. In one example, the mixture of a polymeric material and a non-polymeric material consists essentially of polymeric silicon and inorganic silicon.

Devices fabricated in accordance with embodiments of the invention can be incorporated into a wide variety of electronic component modules (or units) that can be incorporated into a variety of electronic products or intermediate components. Examples of such electronic products or intermediate components include display screens, lighting devices such as discrete light source devices or lighting panels, etc. that can be utilized by the end-user product manufacturers. Such electronic component modules can optionally include the driving electronics and/or power source(s). Devices fabricated in accordance with embodiments of the invention can be incorporated into a wide variety of consumer products that have one or more of the electronic component modules (or units) incorporated therein. Such consumer products would include any kind of products that include one or more light source(s) and/or one or more of some type of visual displays. Some examples of such consumer products include flat panel displays, computer monitors, medical monitors, televisions, billboards, lights for interior or exterior illumination and/or signaling, heads-up displays, fully or partially transparent displays, flexible displays, laser printers, telephones, cell phones, tablets, phablets, personal digital assistants (PDAs), laptop computers, digital cameras, camcorders, viewfinders, microdisplays, 3-D displays, vehicles, a large area wall, theater or stadium screen, or a sign. Various control mechanisms may be used to control devices fabricated in accordance with the present invention, including passive matrix and active matrix. Many of the devices are intended for use in a temperature range comfortable to humans, such as 18 C to 30 C, and more preferably at room temperature (20-25 C), but could be used outside this temperature range, for example, from −40 C to +80 C.

Many mobile devices such as cell phones and tablets include front-facing cameras which may be used by a user of the camera to take a picture of himself/herself. To accommodate this common utilization, many devices have been designed with a front facing flash in addition to the standard rear flash to improve the picture quality of the images which are taken while the individual(s) are facing the phone's display. Such pictures are frequently taken in a low light condition. Using the phone's display as a light source to generate a "flash" can save cost by reducing the need for a separate flash for front facing pictures. For example, if the display is a light emitting diode (LED) lit liquid crystal display (LCD), then the phone may be designed to energize the backlight at full brightness for a short period and synchronize the light pulse with the image sensor, so the display-based flash is on while the image sensor is being read.

In theory the same technique could be implemented if the display is an organic light emitting devices (OLED) and not an LCD. However, the power consumption of an OLED display depends on image content (unlike an LCD), and the power available for the display is limited by the power supply, so as to contain its size and heat generation. Techniques and devices disclosed herein provide ways to overcome the potential brightness limitation on the OLED display for use as a flash for an image capture device in which the OLED display is installed. The disclosed OLED display-implemented flash can produce image specific light of a color generated by selectively energizing one or more subpixels in every pixel, or a subset of pixels, at predetermined levels as opposed to energizing all subpixels simultaneously. By lowering or eliminating the energy that would be spent on energizing an entire set of subpixels, the remaining subpixels can be energized to higher levels and thereby achieve greater brightness.

The subpixel energization configurations in the disclosed display-implemented flash may be determined based on one or more factors related to the environment, desired image effects, or the image sensor that will be used to capture the image. Example environmental factors include characteristics of a target scene to be captured, such a light level and the color of ambient light. Image sensor factors include optomechanical characteristics of an image sensor that will be used to capture the target scene. Image effects factors include specific effects to be achieved based on default or user settings.

The subpixel configuration can be determined at the time of capture, for example, triggered by an image capture command. Upon detecting an image capture command such as activation of a camera button, a remote picture command or other user interface element that activates a camera on the device, the image capture device can either calculate appropriate values for each subpixel to generate a desired visual effect or select an output profile from among a stored set of output profiles.

Herein, a pixel output profile, or output profile, refers to one or more specific configurations of subpixels and their respective energization levels for producing a particular luminous output on an OLED display. An output profile can be configured to achieve a target color of light at a target illumination level for a captured image by generating one or more flash images on the OLED display. For example, one output profile may be configured to achieve an overall effect of a bright tint of red flash while another may be configured to achieve an overall effect of a soft white light flash.

Output profiles can be configured to achieve target colors by illuminating designated subpixels at predetermined levels. For example, an output profile can be configured to illuminate a first set of subpixels (blue) at a first intensity level and illuminate a second set of subpixels (red) and a third set of subpixels (green) at an intensity level lower than the blue subpixels, thereby producing an overall effect of a blue-tinted white light flash.

Based on an output profile, subpixels can be illuminated at maximum brightness without being constrained by power available from the display power supply when less than all of the display subpixels are energized at the same time. In an example shown in FIG. 3, as the display 310 is addressed at the display frame rate (e.g., 60 Hz), the disclosed display-implemented flash generates one flash color on the display for the period of one frame.

As shown in timing diagram 350, in a first frame a blue subpixel "B" is energized at 90% intensity to flash blue light. This is repeated with another color for a subsequent frame, and then repeated for as many frames in the flash cycle as required by the output profile. In combination the flashes produce a designated color. In timing diagram 350, blue "B", red "R", and green "G" subpixels are sequentially energized at 90% intensity to produce white light in combination. In timing diagram 360, blue "B" subpixels are energized at 50% intensity for two frames followed by a red "R" subpixels energized at 90% intensity. Ideally, the subpixel selections and energization levels will be configured to minimize lifetime impacts on the system. For example, in an OLED display in which the quality of light generated by blue subpixels degrades at a faster rate than its red and green counterparts, the usage of blue subpixels should be utilized less than its counterparts to maximize display performance over an extended period of time.

Furthermore, output profiles need not be limited to sequentially energizing one type of subpixel at a time. For example, an output profile could be configured to energize yellow subpixels at 90% intensity and blue subpixels at 10% intensity during a single frame. As disclosed in further detail herein, in some embodiments one or more subpixel types may be illuminated at different points, such as within the same or different frames, and/or some subpixel types may not be illuminated.

In a mobile device (e.g., cell phone, tablet, laptop, etc.), the front camera of the device is generally used for self-portraits or other basically static images. In these situations a very fast exposure time for the image sensor may not be required. Taking this into account, a sensor read-out in the disclosed embodiments can be synchronized with the display-implemented flash in at least three different flash modes, as will be described below.

Figure 4:
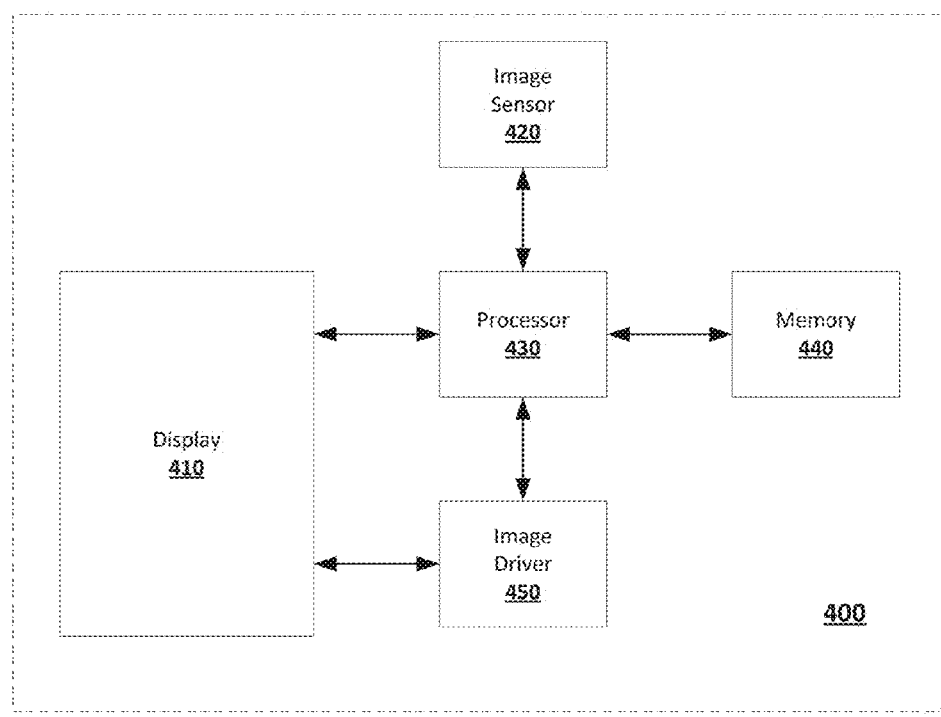
FIG. 4 shows a block diagram of a mobile device 400 according to an embodiment of the disclosed subject matter.

FIG. 4 shows a block diagram of an illustrative mobile device 400 according to an embodiment of the disclosed subject matter. The mobile device 400 includes an OLED display 410, an image sensor 420, a profile selection processor 430, a memory 440, and an image driver 450.

When the image sensor 420 receives a command to capture an image with an accompanying display-implemented flash, the processor 430 either calculates a subpixel configuration profile for a flash image to be generated by the display 410 based on a pre-image collected by the image sensor 420 or selects an output profile from memory 440. The processor 430 can select an output profile based on, for example, a default setting, a user setting an automatic setting, one or more characteristics of a target scene, or/and one or more characteristics of the image sensor 420.

A single output profile or multiple output profiles may can be stored on the memory 440. Memory 440 can be implemented as, for example, an internal memory device of the mobile device 400 or an external memory device such as a card or network/cloud-based storage device.

If a single output profile is stored in memory 440, then the mobile device 400 will use that same individual output profile each time an image capture operation is executed. However, memory 440 can also store multiple output profiles and a record of output profile selections. The record may be included as a determination factor for the processor's selection of subsequent output profiles. For example, the processor 430 may be configured to select output profiles in a pattern that alternates which subpixels are used to generate flash images so as to not overuse a particular type or category of subpixel, e.g., subpixels of a particular color, operating status, or efficiency rating. The processor 430 may further be configured to select an output profile based on an expected lifespan of a set of subpixels in view of the record in order to extend the overall lifespan of the OLED display 410. For example, after blue-type subpixels have been used more than a threshold number of times to generate flash images the processor may thereafter select output profiles that use blue-type subpixels with a lower frequency. This may be useful, for example, to extend the lifetime of blue-type subpixels, which often have lower lifetimes and/or efficiencies than subpixels of other types.

Figure 5:
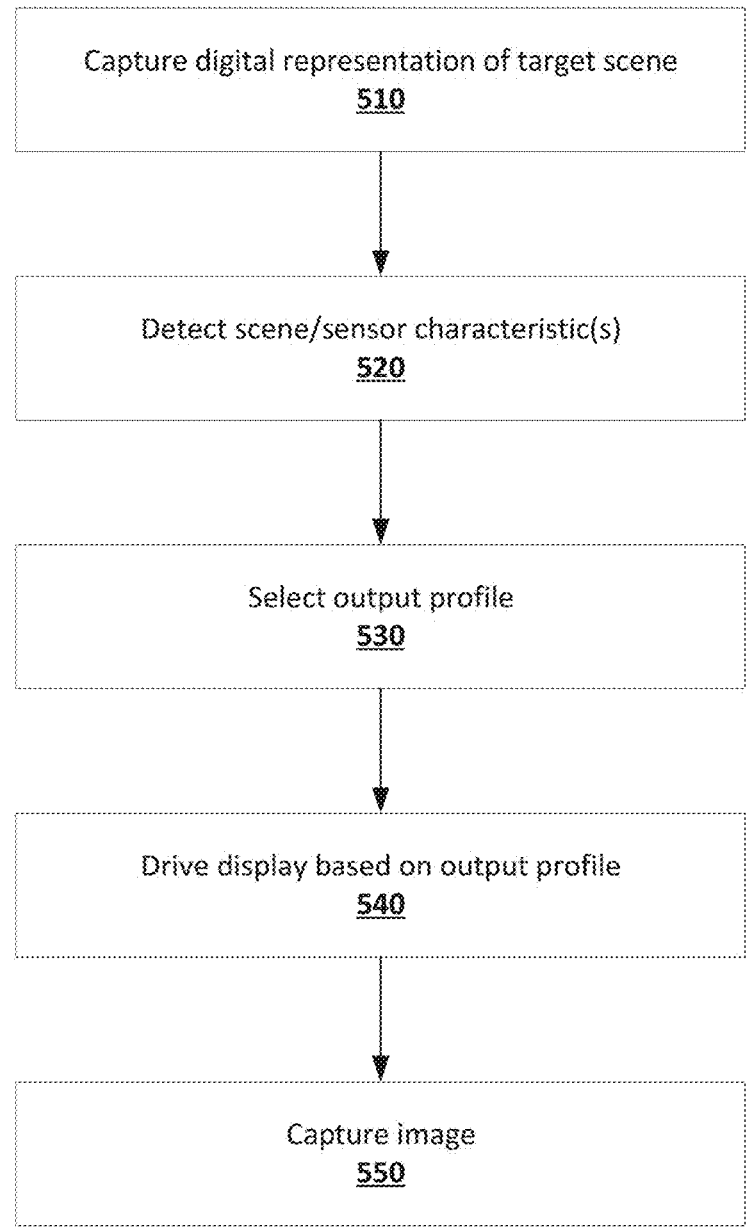
FIG. 5 is a flowchart 500 of a first display-implemented flash mode according to an embodiment of the disclosed subject matter.

FIG. 5 is a flowchart 500 of an illustrative first display-implemented flash mode according to an embodiment of the disclosed subject matter.

Referring to FIGS. 4 and 5, in an example first flash mode as disclosed herein, at operation 510 the image sensor 420 captures a digital representation of a target scene. This initial representation, or pre-image, can be a full image capture or a type of partial scan designed to test light conditions. In either case, the pre-image captures information about the target scene. Based on the pre-image, at operation 520 the processor detects one or more characteristics about the target scene, for example, an estimated distance of a focal object in the target scene from the image sensor 420, an estimate ambient light intensity in the target scene, and/or an estimate ambient light color in the target scene.

The processor can also be configured to detect characteristics of the image sensor 420 itself, such as a level of light sensitivity of the image sensor 420, a level of sensitivity of one or more specific colors, or an operational status of the image sensor. The processor 430 can further be configured to select an output profile, based on the pre-image, to illuminate the target scene at a level required for the image sensor to capture an image above a threshold quality level.

For example, the processor 430 can select an output profile to generate enhancement light that has higher intensity peaks on red spectrum and lower intensity on lower spectrum subpixels, and then perform post-capture image correction taking the output profile into account and generate an output image with the desired color and illumination level outputs. In another example, the processor 430 can select an output profile to enhance light from one of a predetermined image class based on the pre-image, for example, a profile to fill a soft flash for facial images identified in the pre-image. In still another example, the processor 430 can select an output profile that includes a pre-determined sequence of flash images, for example, a first flash image that is an enhanced light that corrects for red eye and a second flash image that corrects for lighting deficiencies. Again, the processor 430 may execute post-capture processing that takes the output profile into account but also uses red eye enhancer algorithms to further enhance the captured image.

At operation 530 the processor may select an output profile from memory 440 based on the detected pre-image characteristics and/or image sensor 420 characteristics. For example, when a target scene is detected to have a high level of red ambient light, an output profile that includes a low level of red light may be selected. In another example, when the image sensor 420 itself is determined to be highly sensitive to blue light, an output profile that includes a low level of blue light may be selected.

At operation 540 the image driver 450 drives the OLED display 410 to generate light output according to the selected pixel output profile and illuminate the target scene. While the target scene is illuminated, the image sensor 420 captures an image of the target scene at operation 550.

Figure 6:
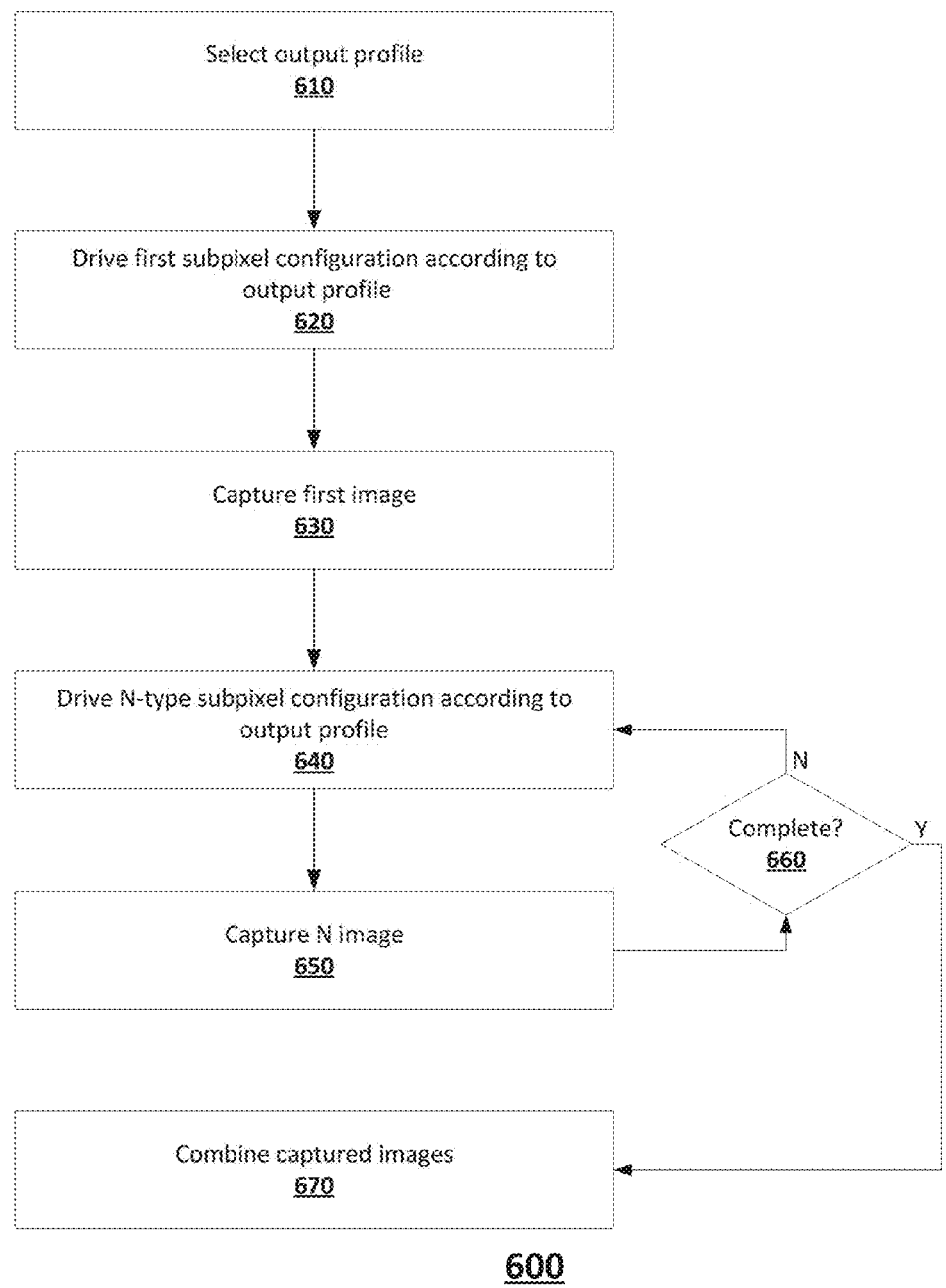
FIG. 6 is a flow chart 600 of a second display-implemented flash mode according to an embodiment of the disclosed subject matter.

FIG. 6 is a flow chart 600 of another example of a display-implemented flash mode according to an embodiment of the disclosed subject matter.

Referring to FIGS. 4 and 6, at operation 610 the processor selects an output profile from memory 440. At operation 620, in a first frame of a display-implemented flash cycle the image driver 450 drives the OLED display 410 to energize a first subpixel configuration according to the output profile. This illuminates the target scene with a first flash image. For example, the first subpixel configuration could be a single type of sub-pixel (e.g., all blue subpixels) or a combination of two or more subpixels at predetermined levels (e.g., blue subpixels at 90% and green subpixels at 10%) to attempt to produce a specific wavelength of light at a specific intensity.

At operation 630 the image sensor captures a first image of the target scene illuminated by the first subpixel configuration flash image.

At operation 640 the image driver 450 enters the next frame of the display-implemented flash cycle and drives the OLED display 410 to energize another subpixel configuration according to the output profile. At operation 650 the image sensor captures another image of the target scene as illuminated by the second subpixel configuration.

At operation 660 the processor determines whether any additional frames of the display-implemented flash cycle are necessary to complete execution of the output profile. If additional frames are required, operations 640-650 are repeated until all flash images designated by the output profile have been executed. For example, the output profile may designate flashing a first configuration (e.g., blue subpixels at 90%) two times followed by flashing a second configuration (e.g., yellow subpixels at 50%) one time. After all of the flash images designated by the output profile have been executed and the corresponding target scene images have been captured by the image sensor 420, the processor 430 combines the captured images at operation 670 to complete the capture of the image.

Figure 7:
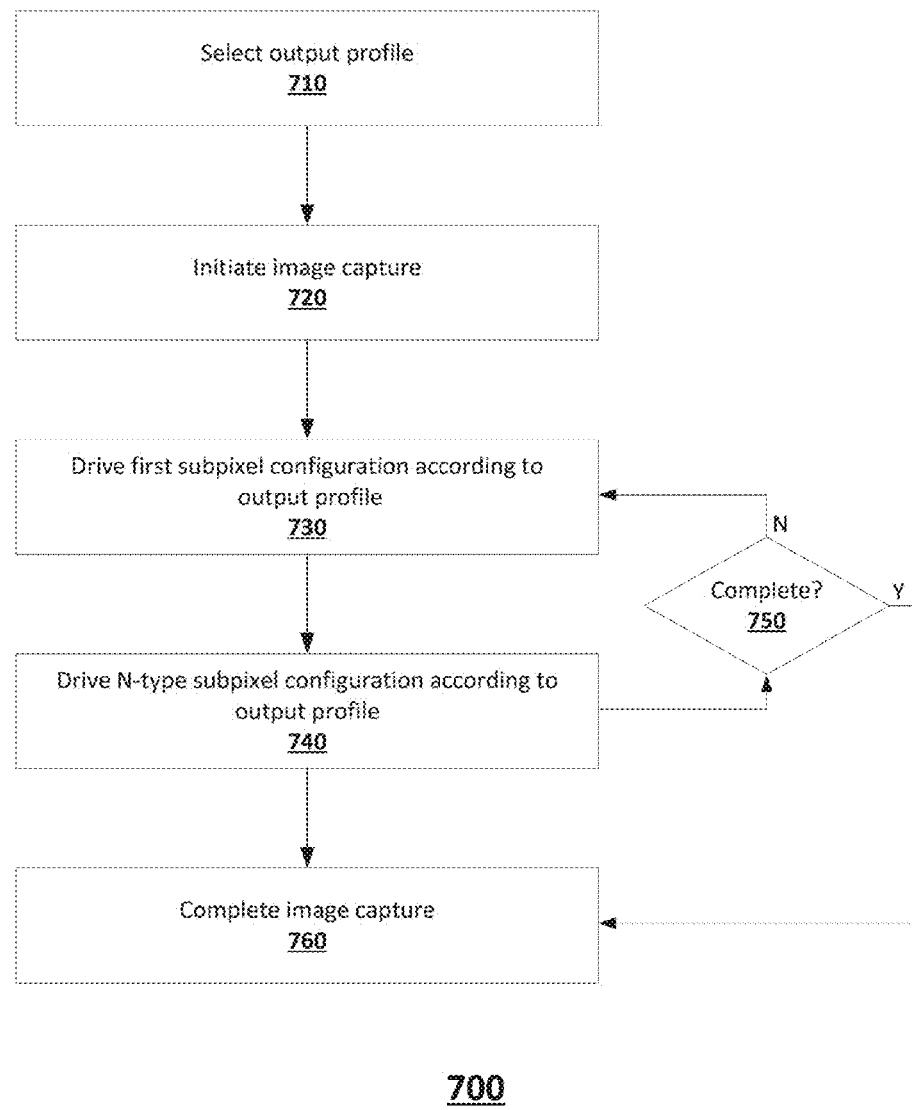
FIG. 7 is a flow chart 700 of a third display-implemented flash mode according to an embodiment of the disclosed subject matter.

FIG. 7 is a flow chart 700 of another example display-implemented flash mode according to an embodiment of the disclosed subject matter.

Referring to FIGS. 4 and 7, at operation 710 the processor selects an output profile from memory 440. At operation 720 the image sensor 420 initiates capture of an image of the target scene. Initiating capture of an image may include, for example, processing pre-capture sensor settings, executing an autofocus function and opening a shutter of the image sensor 420.

At operation 730, during a first frame of the display-implemented flash cycle the image driver 450 drives the OLED display 410 to energize a first subpixel configuration in each of the display 410 pixels, according to the output profile. For example, the image driver 450 may energize a first-type of subpixel in a set of pixels (e.g., blue subpixels) to illuminate the target scene with a flash image. At operation 740 the image driver 450 drives the OLED display 410 to energize another subpixel configuration in each of the display 410 pixels according to the output profile. For example, the image driver 450 may energize a second-type of subpixel in a set of pixels (e.g., red subpixels) to illuminate the target scene with another flash image.

At operation 750 the processor determines whether any additional frames of the display-implemented flash cycle are necessary to complete execution of the output profile. If additional frames are required, operations 730-740 are repeated until all flash images have been executed. For example, referring to FIG. 3, an output profile can be configured to require a flash image of blue subpixels in a first frame, red subpixels in a second frame, and green subpixels in a third frame.

Referring back to FIG. 7, after all of the flash images designated by the output profile have been executed the image sensor 420 completes capture of the image at operation 760. For example, completion of the image capture may include closing the shutter and post-capture processing of the captured data. In this mode, through extended exposure the image sensor innately combines the plurality of images captured corresponding to the flash images generated based on the output profile.

It should be understood that the above-described display-implemented flash modes are examples; many variations and combinations of the elements of the disclosed flash modes are possible. For example, the display-implemented flash mode described in FIG. 6 may include the operations of capturing a digital representation of a target scene and detecting scene/sensor characteristics in order to select an output profile as described in operations 510 and 520 of FIG. 5.

Furthermore, the aforementioned mobile device systems have been described in terms of interactions between components/blocks. A person of ordinary skill in the art would appreciate that such mobile device systems and components/blocks can include those components or specified subcomponents, some of the specified components or subcomponents, and/or additional components, according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of ordinary skill in the art. For example, the mobile device can include an image processor configured to adjust an image that has been captured by the image sensor based at least in part on the selected output profile displayed during capture of the image.

Generally, in the disclosed embodiments an OLED display output profile can be selected based on characteristics of the target scene and/or camera sensor sensitivity. In an output profile, intensity, and if necessary, a number of frames of each flash image in a cycle can be adjusted to produce an optimum captured image of a target scene. For example, if a given sensor is not sensitive to a specific color, an output profile of the disclosed display-implemented flash can increase the brightness of that color, or flash the color for multiple frames. Conversely, if the sensor is very sensitive to a specific color flash, an output profile can decrease its luminance, thereby improving captured image quality and preserving OLED lifetime.

The disclosed OLED display can be energized to produce multiple flashes for each picture to be captured. For instance the display can produce three flashes of red, green and blue, each for a respective frame, such that the processor would integrate the three colors to result in white light. However, the disclosed embodiments are not limited thereto; the OLED display can flash other color combinations, for example, two flashes of yellow (energizing red and green subpixels) and blue light based on an output profile. Furthermore, the display can flash two or more blue flashes (two or more frame times of blue light) for each photo to be recorded, so as to reduce the peak display luminance (e.g., of blue subpixels) to enhance display lifetime.

In a simplified implementation of the described invention in which the image capture sensor is not providing an active feedback mechanism for selecting specific desired outputs from the OLED display acting as a flash, the system can select one of a small subset of preset flash outputs which maximize the subpixel lifetimes without the need for image preprocessing. The specific flash may depend on user feedback or a simple low-light detection feedback mechanism, such as a low light condition, or take a no-color, gray-scale picture in which case one of a small subset of subpixel illumination options will be used to drive the OLED display subpixels. In this case the digital representation of the target scene can be assumed to be one stored in the system without further processing by the image sensor.

It is understood that the various embodiments described herein are by way of example only, and are not intended to limit the scope of the invention. For example, many of the materials and structures described herein may be substituted with other materials and structures without deviating from the spirit of the invention. The present invention as claimed may therefore include variations from the particular examples and preferred embodiments described herein, as will be apparent to one of skill in the art. It is understood that various theories as to why the invention works are not intended to be limiting.

We claim:

1. A method of generating a flash for image capture using an OLED display having a plurality of pixels, comprising:
    selecting an output profile from among a plurality of output profiles;
    driving a first subpixel configuration in each of the plurality of pixels according to the output profile to illuminate a target scene;
    capturing, with the image sensor, a first image of the target scene illuminated by the first subpixel configuration;
    driving a second subpixel configuration in the set of pixels according to the output profile to illuminate the target scene;
    capturing, with the image sensor, a second image illuminated by the second subpixel configuration; and
    combining the first image and the second image.

2. The method of claim 1, wherein the output profile is configured to achieve a combined white light image on the OLED display.

3. The method of claim 1, wherein the output profile is configured to achieve a color on the OLED display that offsets a detection characteristic of the image sensor.

4. The method of claim 1, wherein the output profile designates the first subpixel configuration to energize a first-type subpixel a first number of times and the second subpixel configuration to energize a second-type subpixel a second number of times different from the first number.

5. The method of claim 4, wherein the first-type subpixel is a yellow subpixel and the second-type subpixel is a blue subpixel.

6. The method of claim 1, further comprising:
    capturing a pre-image of the target scene with the image sensor; and
    selecting the output profile based at least in part upon data from the captured pre-image.

7. The method of claim 6, wherein the output profile is selected based on a color dispersion of existing light conditions detected in the pre-image.

8. The method of claim 6, wherein the output profile is selected based on a level of illumination detected in the pre-image.

9. The method of claim 6, wherein the output profile is selected based on the pre-image to illuminate the target scene at a level required for the image sensor to capture an image above a threshold quality level.

10. The method of claim 1, further comprising:
    driving a third subpixel configuration of a third-type subpixel in each of the plurality of pixels according to the output profile to illuminate a target scene;
    capturing, with the image sensor, a third image illuminated by the third-type subpixel; and combining the third image with the first image and the second image.

11. The method of claim 10, wherein the first-type subpixel is a red subpixel, the second-type pixel is a green subpixel, and the third-type subpixel is a blue subpixel.

12. An image processing system, comprising:
an image sensor;
an OLED display having a plurality of pixels;
a profile selection processor configured to select a first output profile from among a plurality of pre-stored output profiles;
an image driver configured to drive subpixel configurations in the plurality of pixels in the OLED display to display a plurality of flash images based on the selected output profile, wherein each of the plurality of flash images are respectively displayed to generate a light output according to the selected pixel output profile to illuminate a target scene during a corresponding operation of capturing an image of the target scene with the image sensor; and
an image processor configured to combine the plurality of captured images into a single image.

13. The image processing system of claim 12, wherein the output profile is configured to achieve a combined white light image on the OLED display.

14. The image processing system of claim 12, wherein the output profile is configured to achieve a color on the OLED display that offsets a detection characteristic of the image sensor.

15. The image processing system of claim 12, wherein the output profile provides flash images including a first subpixel configuration to energize a first-type subpixel a first number of times and a second subpixel configuration to energize a second-type subpixel a second number of times different from the first number.

16. The image processing system of claim 15, wherein the first-type subpixel is a yellow subpixel and the second-type subpixel is a blue subpixel.

17. The image processing system of claim 12, wherein the system is further configured to capture a pre-image of the target scene with the image sensor, and wherein the profile selection processor is further configured to select the output profile based at least in part upon data from the captured pre-image.

18. The image processing system of claim 17, wherein the profile selection processor is configured to select the output profile is based on a color dispersion of existing light conditions detected in the pre-image.

19. The image processing system of claim 17, wherein the profile selection processor is configured to select the output profile based on a level of illumination detected in the pre-image.

20. The image processing system of claim 17, wherein the profile selection processor is configured to select the output profile based on the pre-image to illuminate the target scene at a level required for the image sensor to capture an image above a threshold quality level.

21. The image processing system of claim 12, wherein the plurality of flash images include a first image that energizes red subpixels, a second image that energizes green subpixels, and a third image that energizes blue subpixels.

22. A method of generating a flash for image capture using an OLED, comprising:
selecting an output profile from a memory;
initiating capture of a target scene with an image sensor;
driving, based on the output profile, a first-type subpixel in a set of pixels during a first frame of a display-implemented flash cycle to generate a light output from the first-type subpixel to illuminate the target scene;
driving, based on the output profile, a second-type of subpixel in the set of pixels during a second frame of the display-implemented flash cycle to generate a light output from the second-type subpixel to illuminate the target scene; and
completing capture of the target scene with the image sensor.

23. The method of claim 22, wherein the first-type subpixel is a yellow subpixel and the second-type subpixel is a blue subpixel.

24. The method of claim 22, further comprising:
driving a third-type subpixel in the set of pixels during a third frame of the display-implemented flash cycle to illuminate the target scene prior to completing capture of the target scene.

25. The method of claim 22, wherein the first-type subpixel is a red subpixel, the second-type pixel is a green subpixel, and the third-type subpixel is a blue subpixel.

26. An image processing system, comprising:
an image sensor;
an OLED display;
a profile selection processor configured to select a first output profile from among a plurality of pre-stored output profiles;
an image sensor driver configured to initiate capture of a target scene with the image sensor; and
an image driver configured to drive the OLED display to sequentially display a plurality of images based on the selected output profile to generate a light output according to the selected first output profile to illuminate the target scene when the image sensor driver initiates capture of the target scene with the image sensor,
wherein the image sensor driver is configured to complete capture of the target scene with the image sensor when the image driver completes driving the OLED display to display the plurality of images.

27. The image processing system of claim 26, wherein the plurality of images include a first image that energizes red subpixels, a second image that energizes green subpixels, and a third image that energizes blue subpixels.

28. The image processing system of claim 26, wherein the system is further configured to capture a pre-image of the target scene with the image sensor, and
wherein the profile selection processor is further configured to select the output profile based at least in part upon data from the captured pre-image.

29. The image processing system of claim 28, wherein the profile selection processor is configured to select the output profile is based on a color dispersion of existing light conditions detected in the pre-image.

30. The image processing system of claim 28, wherein the profile selection processor is configured to select the output profile based on a level of illumination detected in the pre-image.

31. The image processing system of claim 28, wherein the profile selection processor is configured to select the output profile based on the pre-image to illuminate the target scene at a level required for the image sensor to capture an image above a threshold quality level.

* * * * *